(12) United States Patent
Abdelal et al.

(10) Patent No.: US 8,341,265 B2
(45) Date of Patent: Dec. 25, 2012

(54) HYBRID SERVER OVERLOAD CONTROL SCHEME FOR MAXIMIZING SERVER THROUGHPUT

(75) Inventors: Ahmed Abdelal, North Andover, MA (US); Wassim Matragi, North Andover, MA (US); Oliver C. Ibe, Andover, MA (US); Rohinton Gonda, Pepperell, MA (US)

(73) Assignee: Sonus Networks, Inc., Westford, MA (US)

( * ) Notice: Subject to any disclaimer, the term of this patent is extended or adjusted under 35 U.S.C. 154(b) by 870 days.

(21) Appl. No.: 12/351,727

(22) Filed: Jan. 9, 2009

(65) Prior Publication Data

US 2010/0180033 A1 Jul. 15, 2010

(51) Int. Cl.
*G06F 15/173* (2006.01)

(52) U.S. Cl. ........ 709/225; 709/223; 709/224; 370/225; 370/230; 370/231; 711/129; 711/173; 711/201; 711/202

(58) Field of Classification Search .................. 709/226, 709/223–225
See application file for complete search history.

(56) References Cited

U.S. PATENT DOCUMENTS

| | | | | |
|---|---|---|---|---|
| 4,224,479 A * | 9/1980 | Crawford | ...................... | 379/134 |
| 4,974,256 A | 11/1990 | Cyr et al. | ...................... | 379/113 |
| 5,067,074 A * | 11/1991 | Farel et al. | ...................... | 709/235 |
| 5,295,183 A | 3/1994 | Langlois et al. | ............... | 379/113 |
| 5,513,255 A * | 4/1996 | Yoo et al. | ...................... | 379/133 |
| 5,541,987 A * | 7/1996 | Topper et al. | .................. | 379/230 |
| 5,754,764 A * | 5/1998 | Davis et al. | ................... | 709/200 |
| 5,881,137 A | 3/1999 | Ginzboorg et al. | ........... | 379/113 |
| 5,918,020 A * | 6/1999 | Blackard et al. | ............... | 709/228 |
| 5,933,481 A * | 8/1999 | MacDonald | .................... | 379/137 |
| 5,956,321 A * | 9/1999 | Yao et al. | ........................ | 370/230 |
| 6,018,519 A | 1/2000 | Ginzboorg | .................... | 370/236 |
| 6,160,875 A | 12/2000 | Park et al. | ...................... | 379/133 |
| 6,252,849 B1 * | 6/2001 | Rom et al. | ...................... | 370/230 |
| 6,259,776 B1 | 7/2001 | Hunt | ............................. | 379/113 |
| 6,338,090 B1 * | 1/2002 | Emmes et al. | ................. | 709/234 |
| 6,442,139 B1 | 8/2002 | Hosein | .......................... | 370/236 |
| 6,690,646 B1 * | 2/2004 | Fichou et al. | ................. | 370/231 |
| 6,826,273 B1 | 11/2004 | Ramaswami et al. | ... | 379/221.03 |
| 6,907,115 B2 | 6/2005 | Joseph et al. | ............ | 379/112.04 |
| 6,983,039 B2 | 1/2006 | Ishikawa et al. | ......... | 379/112.04 |
| 7,072,295 B1 * | 7/2006 | Benson et al. | ................ | 370/230 |
| 2005/0018793 A1 * | 1/2005 | Learned | ........................ | 375/340 |
| 2005/0246381 A1 * | 11/2005 | DeCenzo et al. | ............. | 707/200 |
| 2006/0013133 A1 * | 1/2006 | Peng et al. | ..................... | 370/230 |
| 2007/0233896 A1 | 10/2007 | Hilt et al. | ...................... | 709/238 |
| 2008/0301516 A1 * | 12/2008 | Han et al. | ...................... | 714/748 |
| 2009/0265458 A1 * | 10/2009 | Baker et al. | ................... | 709/224 |

(Continued)

OTHER PUBLICATIONS

Bhatti, N., et al., "Web Server Support for Tiered Services," Hewlett-Packard Research Labs, undated, pp. 1-16.

(Continued)

*Primary Examiner* — Backhean Tiv

(57) ABSTRACT

Described are methods and apparatuses, including computer program products, for controlling server resources. An occupancy value of a buffer and a first utilization value of a first processor are measured. The buffer is configured to store one or more requests for service from at least a first client. The first processor is configured to receive and process the one or more requests from the buffer. A buffer size value is determined based on a processor throughput calculation, and a first service request limit for the first client is determined based on the occupancy value, the first utilization value, and the buffer size value.

25 Claims, 9 Drawing Sheets

U.S. PATENT DOCUMENTS

2010/0180033 A1* 7/2010 Abdelal et al. ............... 709/226
2011/0214150 A1* 9/2011 DeCenzo et al. ............... 725/61

OTHER PUBLICATIONS

Li, K., et al., "A Measurement-Based Admission-Controlled Web Server," Electrical Engineering and Computer Science Department, University of Michigan, undated, pp. 1-9.

Voigt, T., et al., "Adaptive Resource-based Web Server Admission Control," Proceedings of the Seventh International Symposium on Computers and Communications (ISCC'02), 2002, pp. 1-6.

Kasera, S., et al., "Fast and Robust Signaling Overload Control," Bell Laboratories, Lucent Technologies, undated, pp. 1-9.

Bodin, U., et al., "Load-tolerant Differentiation with Active Queue Management," Computer Science and Electrical Engineering, Lulea University of Technology, undated, pp. 1-13.

Iyer, R., et al., "Overload Control Mechanisms for Web Servers," Server Architecture Lab, Intel Corporation, undated, pp. 1-20.

Kasera, S., et al., "Robust Multiclass Signaling Overload Control," undated, pp. 1-10.

Cherkasova, L., et al., "Session Based Admission Control: a Mechanism for Improving Performance of Commercial Web Sites," Hewlett-Packard Labs, undated, pp. 1-10.

Bhoj, P., et al., "Web2K: Bringing QoS to Web Servers," Internet Systems and Applications Laboratory, Hewlett Packard, May 2000, pp. 1-21.

Schwartz, M., "Telecommunication Networks: Protocols, Modeling and Analysis," Section 11-3: Overload Controls for Circuit-switching Machines, Cover page, pp. 594-605.

RFC 768, Postel, J., "User Datagram Protocol," Aug. 28, 1980, pp. 1-3.

RFC 1633, Braden, R., et al., "Integrated Services in the Internet Architecture: an Overview," Jul. 1994, pp. 1-28.

RFC 2475, Blake, S., et al., "An Architecture for Differentiated Services," Dec. 1998, pp. 1-36.

* cited by examiner

HYBRID SERVER OVERLOAD CONTROL SCHEME FOR MAXIMIZING SERVER THROUGHPUT

FIELD OF THE INVENTION

The invention relates generally to methods and apparatuses, including computer program products, for controlling server resources.

BACKGROUND OF THE INVENTION

Efficient communication systems are becoming increasingly important as the demand for communication services increases. Communication services can range from the processing of telephone call setup requests, to the routing of Internet Protocol (IP) data packets over networks, to the processing of Hypertext Transfer Protocol (HTTP) requests for websites. Communication systems generally include servers to process requests for services from clients. Servers can range from telecommunication switches for processing of telephone call setup requests, to network routers for routing of IP data packets, to web servers for processing HTTP requests.

Occasionally, service requests may arrive at a server at a faster rate than the server can process the requests. The rate of receiving requests can vary due to one or more of the following: media-stimulated events (e.g., mass-calling events), emergencies (e.g., emergency calls/messages), equipment failures, and/or auto-scheduled requests (e.g., auto-scheduled calls/requests). The rate of the server processing the requests can change due to one or more of the following: variations in processing demands of different requests, background or administrative activities that run on the server, and/or partial or full failure of software or hardware elements in the server. Communication servers typically implement overload controls to maintain the throughput of service request processing at acceptable levels during these periods of high demand. Two general server overload control schemes are typically implemented. The first approach uses a measure of computer processing unit utilization as a measure of the system overload. The second approach uses a measure of the server's buffer occupancy as a measure of the system overload, which is typically compared to a static optimal buffer size value. Current overload control algorithms typically use only one of computer processing unit utilization or server buffer occupancy as a measure of the system overload.

SUMMARY OF THE INVENTION

One inventive approach to controlling server resources during overload is to use both computer processing unit utilization and server buffer occupancy as a measure of the system overload. In one aspect, there is a computerized method for controlling server resources. The method includes measuring an occupancy value of a buffer and a first utilization value of a first processor. The buffer is configured to store one or more requests for service from at least a first client. The first processor is configured to receive and process the one or more requests from the buffer. The method also includes determining a buffer size value based on a processor throughput calculation, and storing the occupancy value, the first utilization value, and the buffer size value in a computer memory module. The method also includes determining a first service request limit for the first client based on the occupancy value, the first utilization value, and the buffer size value.

In another aspect, the invention features a method for controlling server resources. The method includes measuring, during a first time period, a first utilization value of a processor configured to receive from a buffer and process one or more requests for service. The method also includes determining, based on a processor throughput calculation, a first buffer size value that is associated with the first utilization value. The first buffer size value represents a first size of the buffer that substantially maximizes, with respect to other buffer size values, a processor throughput of the processor being utilized according to the first utilization value. The method also includes limiting acceptance onto the buffer of one or more a new requests for service in a second time period if a first occupancy value of the buffer satisfies a threshold condition based on the first buffer size value. The method also includes measuring, during a third time period after the first time period, a second utilization value of the processor. The method also includes determining, based on the processor throughput calculation, a second buffer size value that is associated with the second utilization value. The second buffer size value representing a second size of the buffer that substantially maximizes, with respect to other buffer size values, the processor throughput of the processor being utilized according to the second utilization value. The method also includes limiting acceptance onto the buffer of one or more a new requests for service in a fourth time period if a second occupancy value of the buffer satisfies a threshold condition based on the second buffer size value. In some embodiments, the processor throughput calculation can include associations between a plurality of utilization values and a plurality of buffer size values.

In another aspect, there is a system for controlling server resources. The system includes a buffer, a first processor, and a controller. The buffer is configured to store one or more requests for service from at least a first client. The first processor is configured to receive and process the one or more requests from the buffer. The controller includes means for measuring an occupancy value of the buffer, means for measuring a first utilization value of the first processor, means for determining a buffer size value based on a processor throughput calculation, and means for determining a first service request limit for the first client based on the occupancy value, the first utilization value, and the buffer size value. In some embodiments, the system can also include a second processor configured to receive and process the one or more requests from the buffer. The controller can be further configured to measure a second utilization value of the second processor and to determine the first service request limit based on the second utilization value.

In another aspect, there is a computer program product. The computer program product is tangibly embodied in a machine-readable storage device and includes instructions being operable to cause a data processing apparatus to measure an occupancy value of a buffer and measure a first utilization value of a first processor. The buffer is configured to store one or more requests for service from at least a first client. The first processor is configured to receive and process the one or more requests from the buffer. The computer program product also includes instructions being operable to case the data processing apparatus to determine a buffer size value based on a processor throughput calculation, and to store the occupancy value, the first utilization value, and the buffer size value in a computer memory module. The computer program product also includes instructions being operable to case the data processing apparatus to determine a first service request limit for the first client based on the occupancy value, the first utilization value, and the buffer size value.

In other examples, any of the aspects above can include one or more of the following features. The first service request limit can be transmitted to the first client. In some embodiments, a second service request limit can be determined for a second client based on the occupancy value, the first utilization value, and the buffer size value. The buffer can be further configured to store one or more requests for service from the second client. The second service request limit can be transmitted to the second client.

In some embodiments, determining the first service request limit can further based on a second service request limit for the first client. The first service request limit is for a first period of time and the second service request limit is for a second period of time before the first period of time. A number of clients that are associated with the first processor can be determined, and the number of clients can be stored in the computer memory module. Determining the first service request limit can be further based on the number of clients. Determining the number of clients that are associated with the first processor can include determining the number of clients that are currently registered to request services from the first processor.

In yet other embodiments, a value can be determined representing processing time spent by the first processor processing service requests received from the first client in a period of time. The value representing processing time can be stored in the computer memory module. Determining the first service request limit can be further based on the value representing processing time. Determining the value representing processing time can be based on a first number of requests processed by the first processor in the period of time and a first value representing a mean time to process the first number of requests. Determining the value representing processing time can further be based on a second number of requests processed by the first processor in the period of time and a second value representing a mean time to process the second number of requests. The first number can represent requests received for a first class of service and the second number can represent requests received for a second class of service.

In some embodiments, the one or more requests for service can include a request for voice service, a request for video service, a request for data service, a request for multimedia service, or any combination thereof. A second utilization value of a second processor configured to receive and process the one or more requests from the buffer can be measure and stored in the computer memory module. Determining the first service request limit can further be based on the second utilization value. In some embodiments, the processor throughput calculation can include associations between a plurality of utilization values and a plurality of buffer size values and wherein determining the buffer size value includes determining that the first utilization value is associated with the buffer size value based on the processor throughput calculation. Each of the plurality of buffer size values can represent a size of the buffer that substantially maximizes, with respect to other buffer size values, a processor throughput of the first processor being utilized according to the associated one of the plurality of utilization values. The processor throughput calculation can include a table, which includes the associations between the plurality of utilization values and the plurality of buffer size values.

In yet other embodiments, the processor throughput calculation can be based on the first utilization value. Measuring the first utilization value can include averaging measured utilization of the first processor during a period of time. Measuring the first utilization value can include determining a substantially maximum utilization of the first processor that is measured during a period of time. Measuring the occupancy value can include averaging measured occupancy of the buffer during a period of time. Measuring the occupancy value can include determining a substantially maximum occupancy of the buffer that is measured during a period of time. In some embodiments, the computer memory module can include a plurality of memory sub-modules. Determining the first service request limit can further based on a predetermined utilization value.

In some embodiments, a second service request limit $n_2$ for the first client can be determined, along with determining a number M of clients that are associated with the first processor, and determining a value w representing processing time spent by the first processor processing service requests received from the first client in a period of time. The first request limit can be for a first period of time and the second service request limit can be for a second period of time before the first period of time. $n_2$, M and w can be stored in the computer memory module. The first service request limit can be $n_2+w\times(b_s-b)$ when the first utilization value is less than a predetermined utilization value and where $b_s$ is the buffer size value and b is the occupancy value. The first service request limit can be $b_s/M$ when the first utilization value is greater than a predetermined utilization value, the occupancy value is greater than the buffer size value, and w is greater than a predetermined value representing processing time. The first service request limit can be $n_2+w\times(b_s-b)$ when the first utilization value is greater than a predetermined utilization value, the occupancy value is greater than the buffer size value, and w is less than the predetermined value representing processing time. The first service request limit can be $n_2$ when the first utilization value is greater than a predetermined utilization value, and the occupancy value is less than the buffer size value.

In other examples, any of the features above relating to a method can be performed by a system, and/or a controller of the system, configured to or having means for performing the method. In addition, any of the features above relating to a method can be performed by a computer program product including instructions being operable to cause a data processing apparatus to perform the method.

Any of the above implementations can realize one or more of the following advantages. By using both computer processing unit utilization and server buffer occupancy as a measure of the system overload, a controller can maintain system integrity and maximize performance during overload. A controller can also maintain balance between keeping the server utilization at a required level as well as bounding the buffer size to keep the service delay at a required level. The implementations can be designed to minimize clients' retransmissions by bounding the service delay, which can result in allowing a multimedia server to handle clients with automatic retransmissions, such as clients acting as SIP or MGCP user agents. The above implementations can account for different classes of service requests, which can result in server operators maximizing their revenue during overload periods. The above implementations can also dynamically evaluate the optimum server buffer size to maximize server throughput as factors vary over time. Increased efficiency can also result from the above implementations, which allows for more cost-effective infrastructure investment. In addition, the above implementations do not have to take into account the reasons for changes in the rates of receiving requests and/or processing the requests. Rather, the above implementations' independence from these reasons advantageously provides for robustness against changes in the system and/or the network that can lead to changes in these rates. With such overload controls, over-provisioning resources can be prevented, thus allowing a cheaper network to cope with surges in demand.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The advantages of the invention described above, together with further advantages, will be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1:
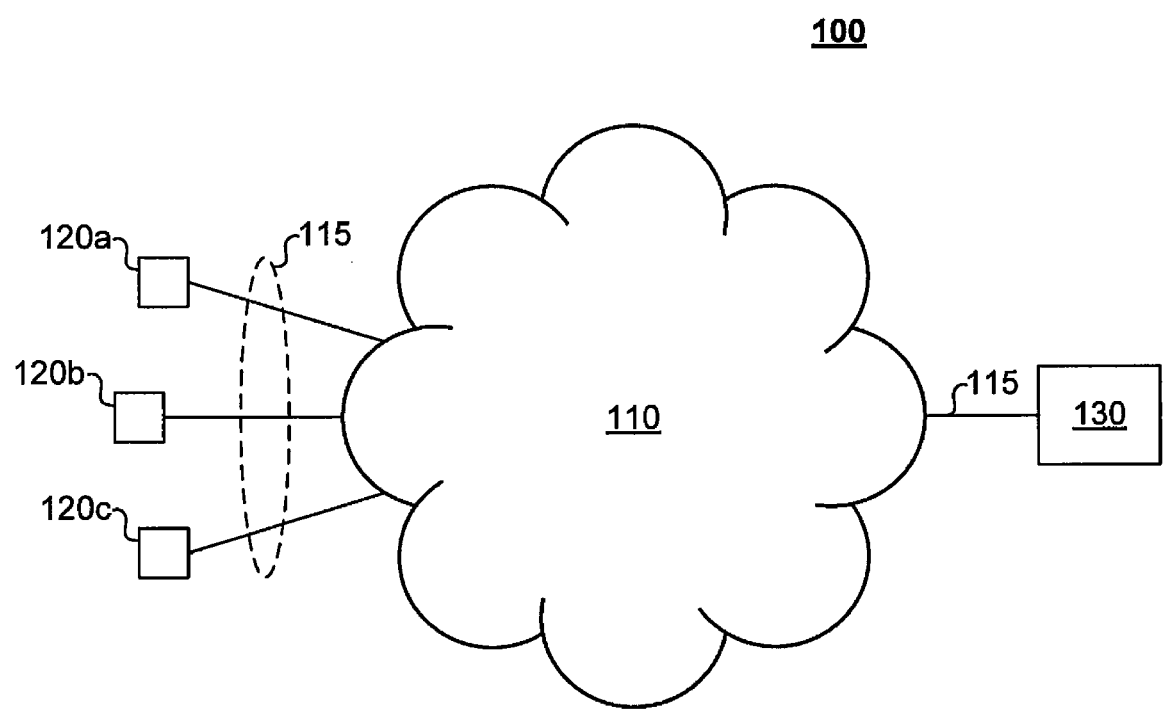
FIG. 1 is a block diagram showing an exemplary network with devices relating to servers processing service requests from clients.

FIG. 1 is a block diagram showing an exemplary network 100 with devices relating to servers processing service requests from clients. Network 100 includes a transmission medium 110, one or more clients 120a, 120b, and/or 120c, generally 120, and at least one server 130. Transmission medium 110 (e.g., a communications network) is responsible for the transfer of information, including requests for services, between one or more of the clients 120 and/or the server 130.

Transmission medium 110 can be coupled to clients 120 by connections 115. Clients 120 can be any devices capable of requesting one or more services from server 130. Clients 120 can include user devices such as computers, telephones, IP phones, mobile devices (e.g., cellular phones, personal digital assistant (PDA) devices, laptop computers, and/or the like), and/or other communication devices. In some embodiments, clients 120 can also perform one or more server functions, and therefore can be considered as a server different from server 130. For example, in telecommunication networks, a telecommunication switch, such as an end office or a tandem switch, can act as a server to any neighboring telecommunication switch, which can act as a client requesting a service such as a call setup. In another example, IP routers or network switches can act as servers to any neighboring or remote IP routers or network switches, which can act as clients requesting transmission of IP packets and/or sending gateway control requests. In yet another embodiment, clients 120 and server 130 can be located in the same computing device, either physically and/or logically. For example, a computer can run multiple tasks, programs, and/or processes, in which case a single processing unit in the server 130 is responsible for processing services for each of the tasks, programs, and/or processes which act as clients 120. In this example, the transmission medium 110 can include an internal bus if the clients 120 are separate from the processing unit (i.e., server 130).

Connections 115 can include electrical wires, optical fibers, and/or wireless transmissions. Connections 115 can also include one or more intermediary devices that connect clients 120 to network 110. Clients 120 can be identified by a unique and/or shared identifier. A unique client identifier can be, for example, a telephone number, an IP address, and/or the like. A shared client identifier can be, for example, a network address, an area code, a country code, a service identifier, and/or the like. Service identifiers can be unique codes that classify a particular service request into one more classes of services. For example, service requests can be classified as either being a request message requesting a new session or a request message requesting an update or modification to an existing session. In another example, service requests can be classified as either a request message that does not require a database lookup or a request message that requires one or more database lookups to process. In yet another example, service requests can be classified based on the level of subscription a client has registered for. In yet a further example, service requests can be classified as either related to e-commerce purchase activities or non-e-commerce activities, such as browsing activities. Serving different classes of services can consume different resources of server 130, such as, for example, memory, disk bandwidth, communication bandwidth, and/or processing cycles. In an alternative embodiment, because classification of the clients 120 and/or the service requests can be optional, the clients 120 and/or the service requests do not have to be identified or classified by an identifier.

Transmission medium 110 can also be coupled to server 130 by a connection 115. Server 130 can include, for example, a web server, an application server, a media server, a gateway, a softswitch, a telecommunications switch (e.g., a toll or tandem switch), a network router or switch, and/or the like. In some embodiments, in a Peer-to-Peer network for example, server 130 can include one of the clients 120. Server 130 can be responsible for providing one or more types of services to one or more of the clients 120 by processing respective requests for these services from the clients 120.

Types of services can include, for example, voice services, video services, data services, multimedia services, and/or other electronic services. Voice services can include, for example, the establishment, maintenance, and release of services associated with telecommunication networks. For example, a SS7 IAM message or a SIP protocol INVITE message can be requests to initiate a new telephone call or call session. Likewise, a SIP protocol UPDATE message can be a request to update the state of an existing call session. Video services can include, for example, the establishment, maintenance, and release of streaming video over the Internet. Streaming video can include Real-time video and/or on-demand video. Data services can include, for example, web sites (processing HTTP requests) or packet routing (routing IP packets). Other services can include, for example, one or more video, audio, and/or data services. In other embodiments, for example, there can be a web server for flight reservation systems, one or more audio servers, e-mail servers, collaboration servers, authentication servers, and/or other server(s).

In one embodiment, for example, server 130 can be a web server that hosts one or more web sites available to clients 120 over the Internet. In another configuration, server 130 can be a tandem switch on the PSTN that receives and processes SS7 signaling messages for setting up and tearing down telephone calls. In yet another configuration, server 130 can be an application server for processing database requests from other clients 120 on network 110. In other configurations, server 130 can be, for example, Sonus Networks PSX™ and Sonus Networks ASX™ servers.

Figure 2:
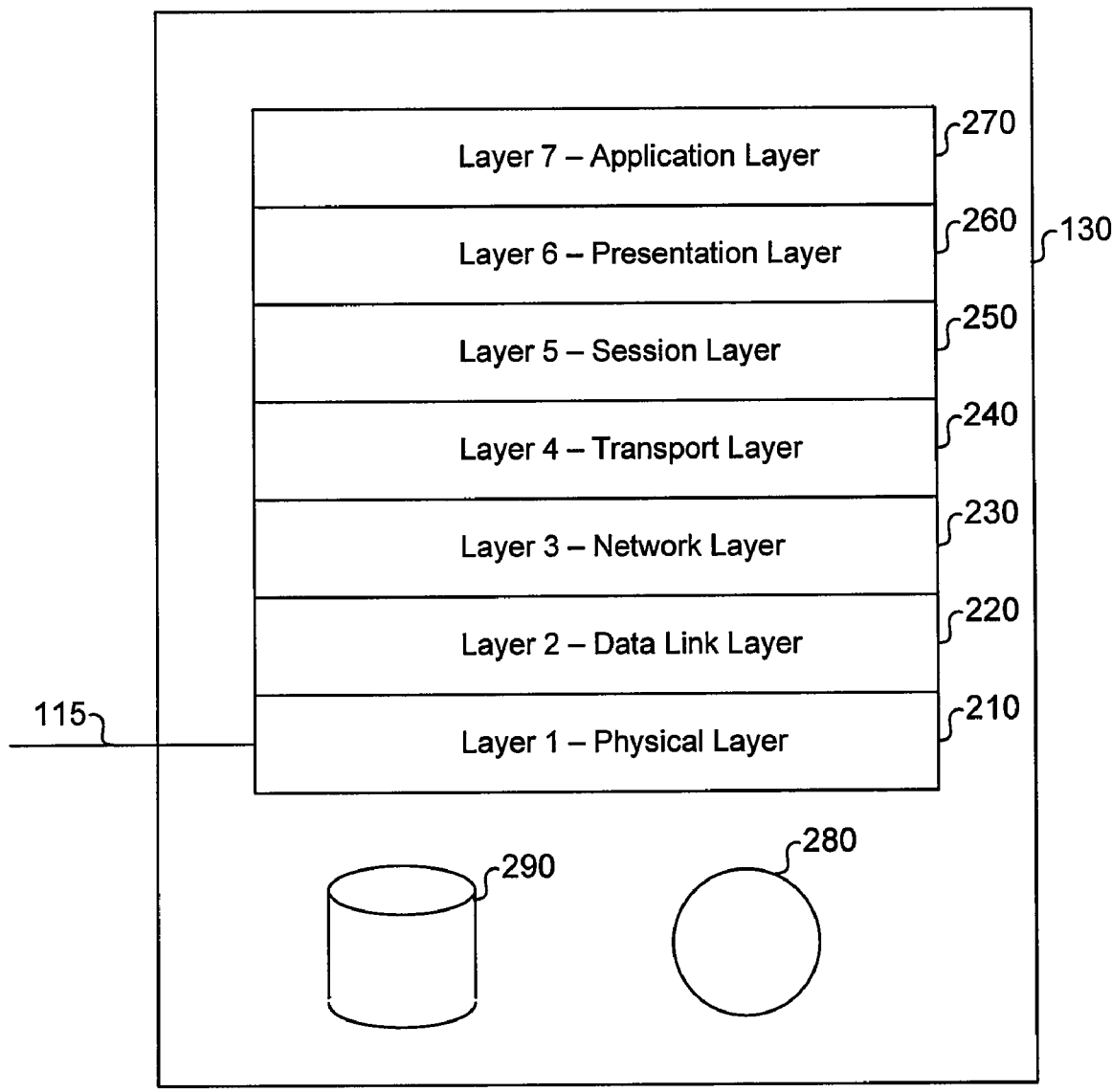
FIG. 2 is a block diagram showing the components of a server.

In general, services, and the processing of service requests for those services, can take place at any layer in a communication protocol stack. FIG. 2 is a block diagram 200 showing the components of server 130. Server 130 includes at least one controller 280, at least one computer memory module 290, and can include one or more protocols conforming to one or more layers 210-270 of the Open Systems Interconnection (OSI) Reference Model (as defined in ITU-T Recommendation X.200). The OSI Reference Model is an abstract description for a communication system, which can be divided into seven layers: a physical layer 210, a data link layer 220, a network layer 230, a transport layer 240, a session layer 250, a presentation layer 260, and an application layer 270. Within each layer, one or more entities can implement a collection of similar functions that provide services to another layer above or below the layer.

Physical layer 210 can provide mechanical, electrical, functional and procedural specifications to activate, maintain, and de-activate physical-connections for bit transmission between data-link-entities. Data link layer 220 can provide functional and procedural specifications for establishment, maintenance, and release of data-link-connections among network-entities and to detect and possibly correct errors that occur in physical layer 210. Network layer 230 can provide specifications to establish, maintain, and terminate network-connections between sources and destinations on one or more networks, and functional and procedural specifications to exchange data between the sources and destinations. Transport layer 240 can provide transparent transfer of data between session-entities and relieves them from any concern with the detailed way in which reliable and cost effective transfer of data is achieved. Transport layer 240 can also optimize the use of the available network-service to provide the performance required by each session-entity at minimum cost. Session layer 250 can provide specifications that control the dialogues/connections between entities. Session layer 250 can also provide services to establish a session-connection between two presentation-entities, to support orderly data exchange interactions, and to release the connection in an orderly manner. Presentation layer 260 can provide for the representation of information that application-entities either communicate or refer to in their communication. Application layer 270 can interact with the software application resident on server 130.

The server 130 illustrated in FIG. 2 includes a protocol stack modeled with respect to the seven layers of the OSI Reference Model, but other models and/or layers can also be used. For example, server 130 can include protocols conforming to only layers 210-230 (e.g., a router or a layer 3 switch). In addition, other models can also be used, such as the TCP/IP model of the Internet, which includes four abstraction layers (link layer, internet layer, transport layer, and application layer). In general, communication protocols do not have to necessarily fall under one of the abstraction layers 210-270, but can, in some cases, be included in more than one layer.

As described above, server 130 can process requests for service from one or more clients 120 using one or more protocols in the protocol stack 210-270. Controller 280 can implement overload controls to maintain the throughput and/or delay of service request processing in one or more of the layers of the protocol stack 210-270. In one embodiment, controller 280 can be a processor or an apparatus. In another embodiment, controller 280 can be a logical function executed by another processor or apparatus in server 130. As a processor, controller 280 can be configured to execute a computer program to perform functions of the invention by operating on input data and/or generating output data. Processors suitable for the execution of a computer program include, by way of example, both general and special purpose microprocessors, and any one or more processors of any kind of digital or analog computer. A processor can receive instructions and data from, for example, a read-only memory or a random access memory or both.

As an apparatus, controller 280 can be implemented as special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

In FIG. 2, the controller 280 is illustrated to be separate from the protocol stack 210-270, but other configurations can also be used. For example, controller 280 can be incorporated into one or more of the protocols or layers in the protocol stack 210-270 or the protocol stack 210-270 can be included in the controller 280.

Controller 280 is communicatively coupled to computer memory module 290. Computer memory module 290 can include one or more memory devices or memory sub-modules for storing instructions and/or data. Memory devices, such as a cache, can be used to temporarily store data. Memory devices can also be implemented as mass-storage devices. Controller 280 and computer memory module 290 can be supplemented by and/or incorporated in special purpose logic circuitry.

Figure 3:
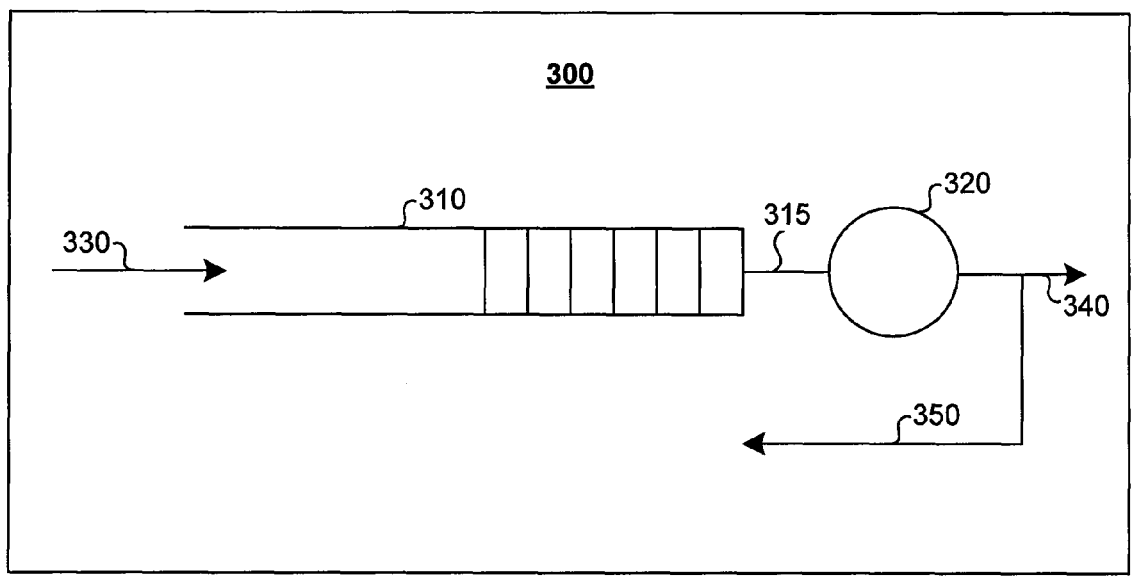
FIG. 3 is a block diagram showing the components of a processor queue model.

FIG. 3 is a block diagram showing the components of a processor queue model 300. Processor queue model 300 can represent, either physically or logically, how service requests are processed in one or more layers of the protocol stack 210-270 of server 130. Processor queue model 300 includes a buffer 310 coupled to a processing unit 320 via connection 315. Buffer 310 can be configured to receive 330 and store one or more requests for service based on a first-in-first-out policy. Service requests can be received 330 from connection 115 or from one of the layers of the protocol stack 210-270. The size of buffer 310 can be fixed or variable. In one embodiment, for example, buffer 310 can store 2,000 service request messages.

Server overload control schemes are typically time driven. In time driven schemes, system processing can be measured at predetermined times or during predetermined periods of time, which can be labeled sequentially as t=0, 1, . . . k−1, k, k+1, . . . .

Processing unit 320 can be configured to receive one or more requests for service for processing, based on a first-in-first-out policy, from buffer 310 via connection 315. Processing unit 320 can either provide the requested service 340 or can reject the request for service 350. In some embodiments, if the request for service is rejected, processing unit 320 can provide feedback 350, indicating that the request was rejected, to the client 120 that requested the service. In a supplemental or alternative embodiment, if the request for service is rejected, processing unit 320 can silently drop the request, without sending feedback. Controller 280 can either be incorporated into or with processing unit 320 or can be a separate device (if implemented physically) or a separate function (if implemented logically on another processor in server 130). In an alternative embodiment, processing unit 320 or processor queue model 300 can be incorporated into controller 280.

Processing unit 320 can include one or more processors and/or can include multiple processing threads for performing parallel processing on one more service requests. With multiple processors and/or processing threads, service requests can be divided between the different processors and/or threads in a variety ways. In some embodiments with $n_p$ number of processors, each processor can be responsible for accepting new requests every $n_p$th time interval. In other embodiments with $n_p$ number of processors, each processor can be apportioned a $1/n_p$ percentage of the received service requests. In yet other embodiments with multiple processors, each processor can be assigned to process certain classes of service requests and/or service requests from certain predetermined groups of clients 120.

Generally, server overload control schemes can either be classified as external control schemes, internal control schemes, or both. External server overload control schemes can react to overload measures by implementing control over or providing feedback to remote clients. For example, during an overload condition, a server can signal to one or more of its clients to decrease or stop their requests for service. In contrast, internal server overload control schemes can react to overload measures by implementing local controls. For example, during an overload condition, a server can select to limit the number of service requests that are processed. In one embodiment, the server can prevent new service requests from being stored on buffer 310. In another embodiment, the server may allow new service requests onto buffer 310, but elect to reject the service request when the message is processed by processing unit 320. Rejection of service requests by processing unit 320 can be based on a percentage blocking, where a predetermined percent of service requests are rejected, and/or gapping, where all service requests processed in a certain time gap are rejected. The time gap and/or the predetermined percent can be a function of the measured overload. For example, the rejection percentage and/or the time gap can increase proportionally to the measured overload once a certain threshold is met.

Figure 4:
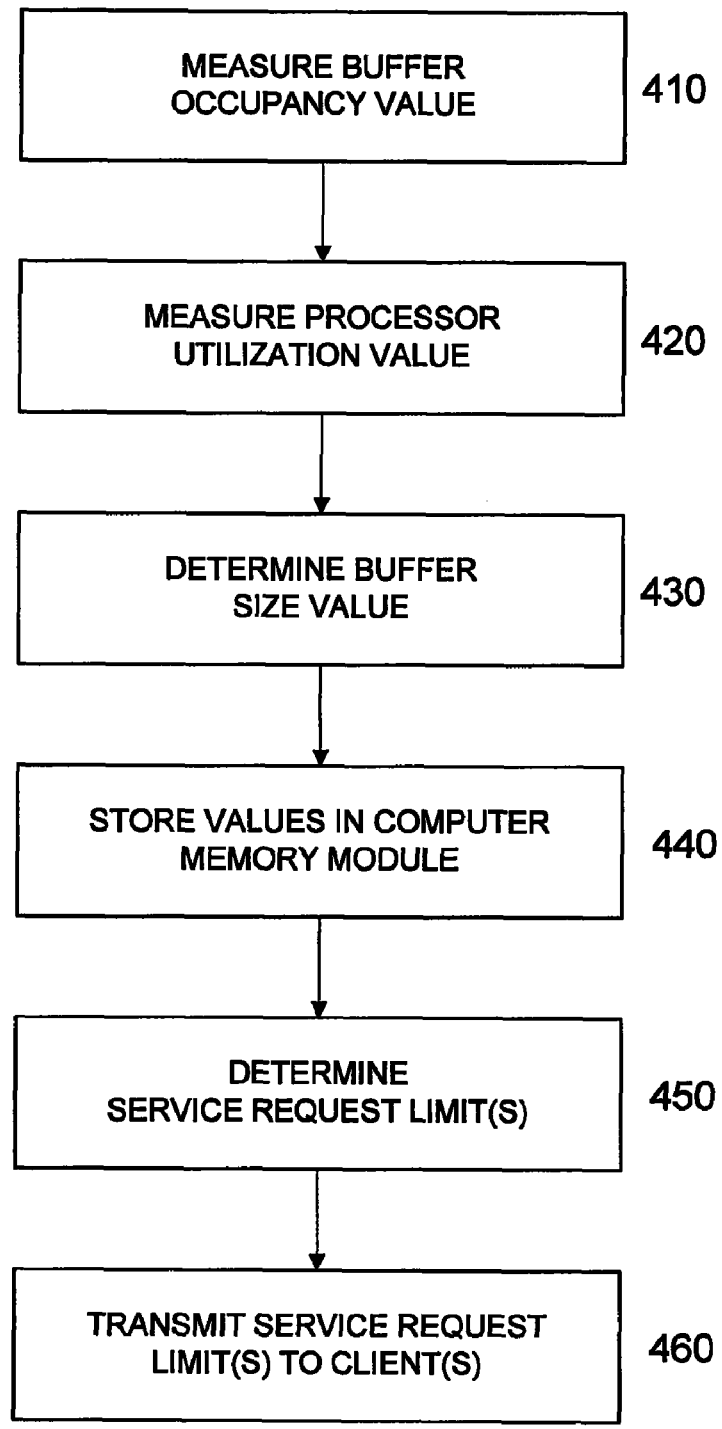
FIG. 4 is a flowchart depicting external control of server resources.

FIG. 4 is a flowchart 400 depicting external control, performed by controller 280, of server 130 resources. The elements of flowchart 400 are described using the exemplary processor queue model 300 of FIG. 3. Control of server resources includes measuring an occupancy value of buffer 310 (410), measuring a utilization value of processing unit 320 (420), determining a buffer size value based on a processor throughput calculation (430), storing the occupancy value, the utilization value, and the buffer size value in computer memory module 290 (440), determining one or more service request limits for one or more clients 120 based on the occupancy value, the first utilization value, and the buffer size value (450), and/or transmitting the one or more service request limits to the one or more clients 120 (460). In one embodiment, controller 280 can implement the algorithm depicted in flowchart 400 with respect to windowed-time intervals of length T. For example, if the interval of length T is set to be 1 second, then controller 280 performs the elements of flowchart 400 every 1 second. In a supplemental or alternative embodiment, controller 280 can implement flowchart 400 on an event-driven basis. For example, if the number of new received requests since the last time flowchart 400 was executed exceeds a value N, then controller 280 can execute flowchart 400. A service request limit can represent the number of service requests that a particular client 120, or class of clients 120, is allowed to send to server 130 in a future period of time (e.g., during one or more future time intervals of length T). The elements of flowchart 400 can be performed separately for each client 120 (e.g., clients 120a, 120b, and 120c), or can be performed concurrently.

Measuring an occupancy value of buffer 310 (410) can include averaging the measured occupancy of the buffer 310 during a period of time (e.g., during one or more of the prior time intervals of length T). In an alternative embodiment, measuring the occupancy value of buffer 310 (410) can include determining a substantially maximum occupancy of the buffer 310 that is measured during a period of time (e.g., during one or more of the prior time intervals of length T).

Measuring a utilization value of processing unit 320 (420) can include averaging the measured utilization of processing unit 320 during a period of time (e.g., during one or more of the prior time intervals of length T). In an alternative embodiment, measuring the utilization value of processing unit 320 (420) can include determining a substantially maximum utilization of the processing unit 320 that is measured during a period of time (e.g., during one or more of the prior time intervals of length T). In one embodiment, utilization of processing unit 320 can be defined as the percentage of time that processing unit 320 is processing service requests during a predetermined period of time. In an alternative embodiment, utilization of processing unit 320 can be defined as the product of the arrival rate of service requests at server 130 to the mean time it takes to process each of the requests.

In an alternative or supplemental embodiment where processing unit 320 includes more than one processor, a utilization value can be measured for each respective processor. A utilization value representative of processing unit 320 in such a case can be determined, for example, by averaging the utilization values of the individual processors of processing unit 320. The utilization value of processing unit 320 can be represented by $\rho$.

A determined buffer size value based on a processor throughput calculation (430) can be an optimal buffer size for buffer 310. Typically, the actual size of buffer 310 is set high enough in order to prevent inadvertent loss of service requests that would result if buffer 310 was full and could not accept additional requests for service. However, excessively large buffer sizes can increase the delay in service before service requests can be processed by processing unit 320. A large buffer 310 can, for example, lead to server 130 processing requests that have been timed-out from the clients 120 perspective, possibly resulting in retransmission of the same requests. An optimal buffer size for buffer 310 can minimize the probability that a request will be dropped if buffer 310 is full and maximizes the probability of meeting a request deadline. As a result, the throughput through the server can be maximized by minimizing buffer overflow and decreasing the probability of processing stalled service requests. In one embodiment, the optimal buffer size for buffer 310 does not correspond with the actual size of buffer 310 (e.g., the optimal buffer size can be less than the actual buffer size and/or the occupancy value of buffer 310). The optimal buffer size can be represented by $b_{opt}$.

In one embodiment, the processor throughput calculation can include associations between a plurality of predetermined utilization values and a plurality of predetermined buffer size values. In this case, determining the buffer size value can include determining that the measured utilization value is associated with the buffer size value based on the processor throughput calculation. For example, the processor throughput can include a table of values mapping one or more predetermined utilization values (e.g., $\rho$) to one or more predetermined buffer size values (e.g., $b_{opt}$). In a supplemental or alternative embodiment, each of the plurality of buffer size values included in the processor throughput calculation can represent a size of buffer 310 that substantially maximizes, with respect to other buffer size values, a processor throughput of processing unit 320 when it is being utilized at the associated utilization value $\rho$.

Determining one or more service request limits for one or more clients 120 (450) can further be based on a desired or optimal utilization value of processing unit 320, which can be represented by $\rho_{opt}$. An optimal utilization value can be predetermined or specified based on the particular service and/or overload scheme that is implemented by server 130. Determining one or more service request limits for one or more clients 120 (450) can further be based on one or more previously evaluated service request limits for the one or more clients 120. For example, a service request limit for client 120a for period of time k can be based on the service request limit for client 120a for period of time k−1.

Determining one or more service request limits for one or more clients 120 (450) can further be based on the number of clients 120 that are associated with server 130, which can be determined by controller 280. The number of clients 120 can be static (e.g., provisioned) and/or dynamic (e.g., as clients 120 become active or inactive). In one embodiment, determining the number of clients 120 associated with server 130 can include determining the number of clients 120 that are currently registered to request services from server 130. Registration can occur by paid or unpaid subscription.

Determining one or more service request limits for one or more clients 120 (450) can further be based on a value representing processing time spent by processing unit 320 servicing and/or processing service requests from a client 120 in a particular period of time, which can be determined by controller 280. The value representing processing time can be represented by w. In one embodiment, w can be based on the product of the number of service requests processed by processing unit 320 in a particular period of time and the mean time to process each service request. In a supplemental embodiment, w can be based on the mean time to process particular classes of service requests times the number of service requests from each respective class of service. Determining the mean time to process a service request can be performed dynamically and/or statically. For example, the mean time can be calculated by determining the total time taken to process a certain number of requests during a period of time and averaging the total time by the number of requests. The mean time can be provisioned to controller 280 and/or the controller 280 can periodically update the mean time value by determining the average processing time for one or more requests.

Figure 5:
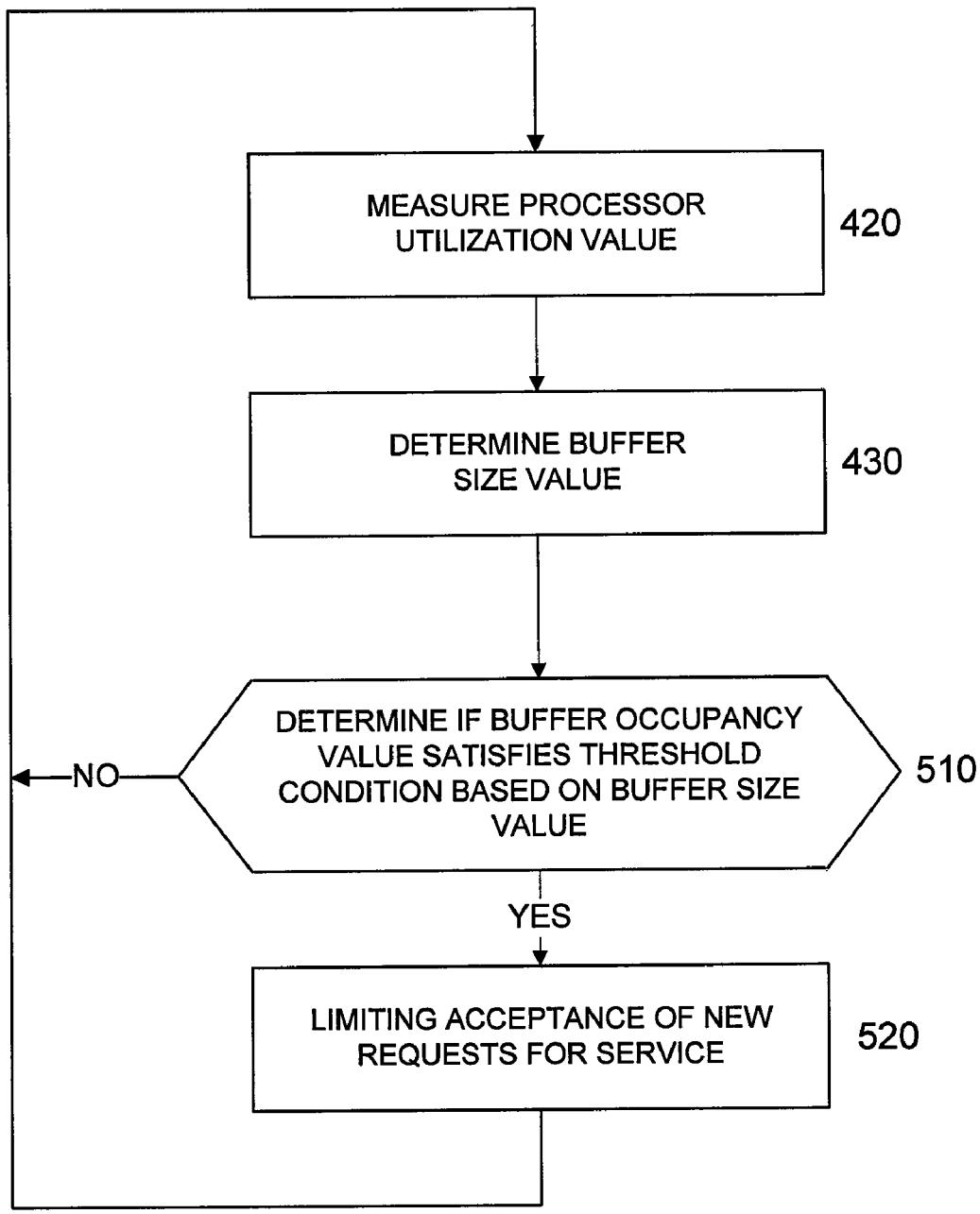
FIG. 5 is a flowchart depicting internal control of server resources.

FIG. 5 is a flowchart 500 depicting internal control, performed by the controller 280, of server 130 resources. The elements of the flowchart 500 are described using the exemplary processor queue model 300 of FIG. 3. Control of server resources includes measuring a utilization value of processing unit 320 (420), determining, based on a processor throughput calculation, a buffer size value that is associated with the measured utilization value (430), determining if a buffer occupancy value of the buffer 310 satisfies a threshold condition based on the buffer size value (510), and/or limiting acceptance onto buffer 310 of one or more a new requests for service if the threshold condition is satisfied (520).

In one embodiment, satisfaction of the threshold condition can occur if a measured buffer occupancy of buffer 310 is greater than the buffer size value, which can be an optimal buffer size value $b_{opt}$. Alternative or supplemental embodiments can also be used that require satisfaction of the threshold condition to be any arbitrary function of a measured buffer occupancy of buffer 310 and the buffer size value, in which the threshold condition represents a deterioration of the processing throughput of server 130. For example, the threshold condition can include multiple conditions each of which can provide for a different acceptance limit of new requests for service (520). In one embodiment, the threshold condition can be linearly proportional to the difference between the measured buffer occupancy of buffer 310 and the buffer size value such that the number of new requests for service that are limited (520) can be made proportional to this difference. Limiting acceptance onto buffer 310 can include, for example, preventing one or more new requests for service from being stored onto buffer 310.

Next, a particular embodiment of flowchart 400 is described in more detail. Server 130 can periodically transmit updates to the one or more of the clients 120 about the number of requests that the respective client is allowed to send to server 130 in the next period of time (e.g., sometimes referred to as the service request limit). The server controlling algorithm can operate with respect to windowed-time intervals of length T. The number of clients 120, labeled 1, 2, . . . , M, that have access to server 130 can be represented by M. The service request limit for client m sent to server 130 in time period k can be represented as $n_{m,k}$, where $k \geq 1$. The total number of service requests that server 130 receives in time period k can be represented by:

$$n_k = \sum_{m=1}^{M} n_{m,k}. \tag{1}$$

Different types of service requests can consume different processing times. For example, a service request that requires one or more database lookups can require more processing time than a request that does not require a database lookup. The total processing time required by requests received during time period k from client m can be represented as $t_{m,k}$. Assuming that server 130 can process N classes of service requests, that the mean time to process service requests from service class i is $1/\mu_i$, i=1, 2, . . . N, and that $n_{i,m,k}$ represents the number of service requests from class i received from client m during time period k, then:

$$t_{m,k} = \sum_{i=1}^{N} \frac{n_{i,m,k}}{\mu_i}. \tag{2}$$

Thus, the fraction of processing time consumed by server 130 on the service requests received from client m during time period k can be represented by:

$$w_{m,k} = \frac{t_{m,k}}{T_k}, \tag{3}$$

where $T_k \leq T$ is the total time spent processing service requests in time interval k and T is the length of the time interval.

The mean number of messages in buffer 310 within time period k can be represented as the occupancy value $b_k$. The utilization of processing unit 320 within time period k can be represented as the utilization value $\rho_k$. The computerized method for controlling server 130 resources under the present embodiment operates as follows. When server 130 is initialized, for example at startup or at a predetermined time, the service request limits for all clients 120 is set to:

$$n_{m,0} = \frac{b_{opt}}{M}. \tag{4}$$

In this manner, server 130 initially uses the complete partitioning method to equally share the optimal buffer size, i.e., the buffer size value, among the M clients. After the initialization time period, the contributions by clients 120 are likely to be different and the number of assigned packets, i.e., the service request limits, can be made proportional to the contribution of each client 120 in the prior period of time as follows:

if $\rho_k < \rho_{opt}$, then $n_{m,k} = n_{m,k-1} + w_{m,k}(b_{opt} - b_k)$ (5a)

if $\rho_k > \rho_{opt}$, $b_k > b_{opt}$, $w_{m,k} \geq 0.5$, then $n_{m,k} = b_{opt}/M$, (5b)

if $\rho_k > \rho_{opt}$, $b_k > b_{opt}$, $w_{m,k} < 0.5$, then $n_{m,k} = n_{m,k-1} + w_{m,k}(b_{opt} - b_k)$, (5c)

if $\rho_k > \rho_{opt}$, $b_k < b_{opt}$, then $n_{m,k} = n_{m,k-1}$. (5d)

As illustrated in equations (5a)-(5b), as long as processing unit 310's utilization value is less than the optimal utilization value, then the control is based on the occupancy value of buffer 310. Specifically, if $b_{opt}-b_k>0$, then each client will be allowed to increase their service request limit in a manner that is proportional to what it transmitted in the prior period of time. Similarly, if $b_{opt}-b_k<0$, then each client will cut back proportionally. However, when $b_{opt}-b_k<0$ and processing unit 310's utilization value exceeds the optimal utilization value, then a client 120 that sent more than half of the received traffic will be required to cut back to the initial allocation of $b_{opt}/M$. A client that sent less than half of the traffic will not be required to go through such a drastic cutback.

In the embodiment illustrated by equations (5a)-(5b), the value evaluated against $w_{m,k}$ was set to 0.5, but other values can also be used. For example, if no one client 120 typically sends more than half of the traffic, then $w_{m,k}$ can be set to less than 0.5.

Next, a particular embodiment of determined a buffer size value is described in more detail. Service requests that arrive at server 130 can be associated with real-time traffic. Real-time service requests can include a hard deadline that must be met by each request such that if a request's queuing delay exceeds a threshold d, then the request drops out of the queue. The threshold d can be referred to as the deadline. A random variable that denotes the waiting time in the system can be represented by W. The system can be modeled, in one embodiment, as an M/M/1/K queue using Kendall notation, where the first M represents that the arrival process is a Poisson arrival process (Markovian), the second M represents that the service time distribution is exponential service time (Markovian), where the 1 represents that the system includes one service channel or server, and where K represents the capacity of the system or the queue. The cumulative distribution function (CDF) of W in a M/M/1/K queue is known to be given by the following equation:

$$F_W(t) = P[W \le t] = 1 - \frac{(1-\rho)e^{-\mu t}}{1-\rho^K} \sum_{n=1}^{K-1} \rho^n \sum_{j=0}^{n-1} \frac{(\mu t)^j}{j!}, t \ge 0. \quad (6)$$

The packet arrival rate at the server can be represented by the variable $\lambda$. The throughput of the server can be defined as the number of useful requests that the server is able to process per unit time and can be represented by the variable S. The throughput of the system can then be given by:

$$S = \lambda(1-p_K)F_W(d), \quad (7)$$

where $p_K$ represents the blocking probability in an M/M/1/K queuing system, which is known to be given by:

$$p_K = \frac{(1-\rho)\rho^K}{1-\rho^{K+1}}, \quad (8)$$

Since $\rho$ is optimally less than 1 and $$\frac{dp_K}{dK} = \frac{\rho^K(1-\rho)\ln(\rho)}{(1-\rho^{K+1})^2} < 0, \quad (9)$$

then it can be seen that $p_K$ is a monotonically decreasing function of K. In particular, when K=0, then $p_K=1$, and when K=$\infty$, then $p_K=0$. Also, since $$1 - p_K = \frac{1-\rho^K}{1-\rho^{K+1}}, \quad (10)$$

and $\lambda = \mu\rho$, where $\mu$ can represent the service rate, then the throughput equation (7) can be rewritten as:

$$S = \mu\rho\left\{\frac{1-\rho^K}{1-\rho^{K+1}}\right\}\left\{1 - \frac{(1-\rho)e^{-\mu d}}{1-\rho^K}\sum_{n=1}^{K-1}\rho^n\sum_{j=0}^{n-1}\frac{(\mu d)^j}{j!}\right\}. \quad (11)$$

For a given service request arrival rate $\lambda$ and a given delay threshold d, the optimal value of the queue size $b_{opt}$ can be defined as the value of K in equation (11) that maximizes the throughput S. A buffer size value can be based on a processor throughput calculation such as, for example, equation (11). The buffer size value can be the queue size $b_{opt}$ that substantially maximizes the throughput S for a given processor utilization value $\rho$, delay d, and/or service rate $\mu$. In one embodiment, determining the buffer size value can include calculating S in equation (11) for one or more different values of $b_{opt}$ and determining which value of $b_{opt}$ provides the largest throughput S. In an alternative embodiment, determining the buffer size value can include referring to processor throughput calculations previously performed for a range of processor utilization values $\rho$. For example, determining the buffer size value can be based on a processor throughput calculation table, which can include one or more buffer size values associated, respectively, with one or more processor utilization values $\rho$. In alternative or supplemental embodiments, the one or more buffer size values can also be associated, respectively, with one or more values representing delay d and/or service rate $\mu$. The one or more buffer size values in the table can be, based on prior calculations, the value of $b_{opt}$ that substantially maximized S in equation (11) given the respective processor utilization value $\rho$.

The estimated arrival rate $\lambda$ can be given by:

$$\lambda = \frac{\sum_{m=1}^{M} n_{m,k}}{T_k}, \quad (12)$$

where, as defined earlier, M is the number of server clients, $n_{m,k}$ is the number of requests received from client m during time period k, and $T_k$ is the time spent during time period k processing requests.

Computational Results

A quantitative investigation illustrates how the buffer size settings can effect server throughput under the M/M/1/K model. In this investigation, the mean service time is 100 microseconds and the waiting time deadline is 5 milliseconds.

Figure 6:
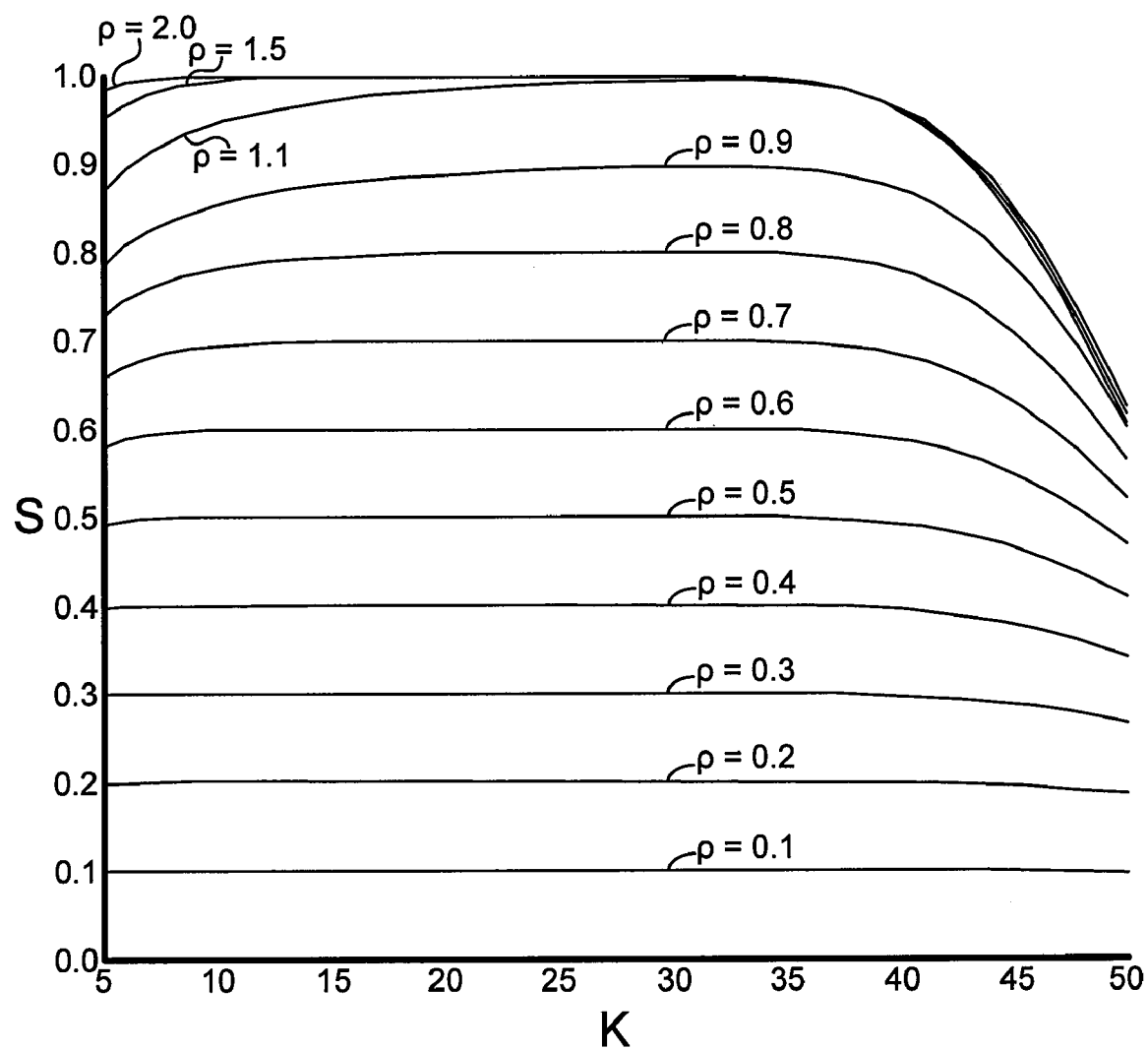
FIG. 6 is a two-dimensional plot illustrating throughput S versus buffer size K for different values of processor utilization $\rho$.

FIG. 6 is a two-dimensional plot illustrating throughput S versus buffer size K for different values of processor utilization $\rho$. As FIG. 6 illustrates, for a given $\rho$, the throughput S first increases, then remains fairly constant for a wide range of K and then begins to decline when K reaches the value of approximately 30. Therefore, at high values of K, where the packet delay becomes high, the throughput S is affected more by the deadline constraint than by the increase in buffer size K. FIG. 6 also shows that for a given level of utilization there is a buffer size K that maximizes the throughput S. Below K, the throughput S decreases due to the limited server buffer size, which blocks new requests although the server has capacity to process them. On the other side of K, increases in K can lead the server to waste processing cycles in stale requests that eventually will be retransmitted.

Figure 7:
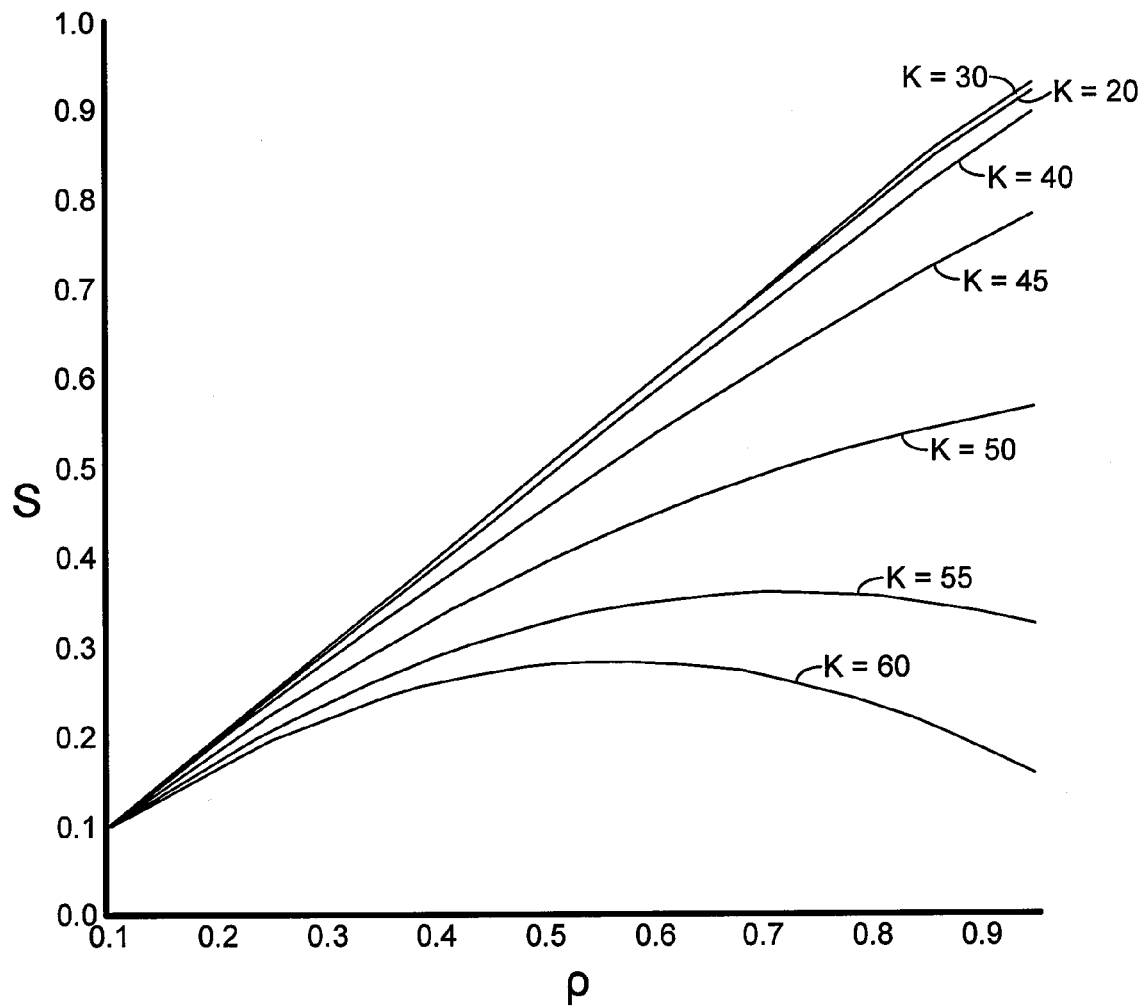
FIGS. 7-9 are two-dimensional plots illustrating throughput S versus processor utilization $\rho$ for different values of buffer size K.
Figure 8:
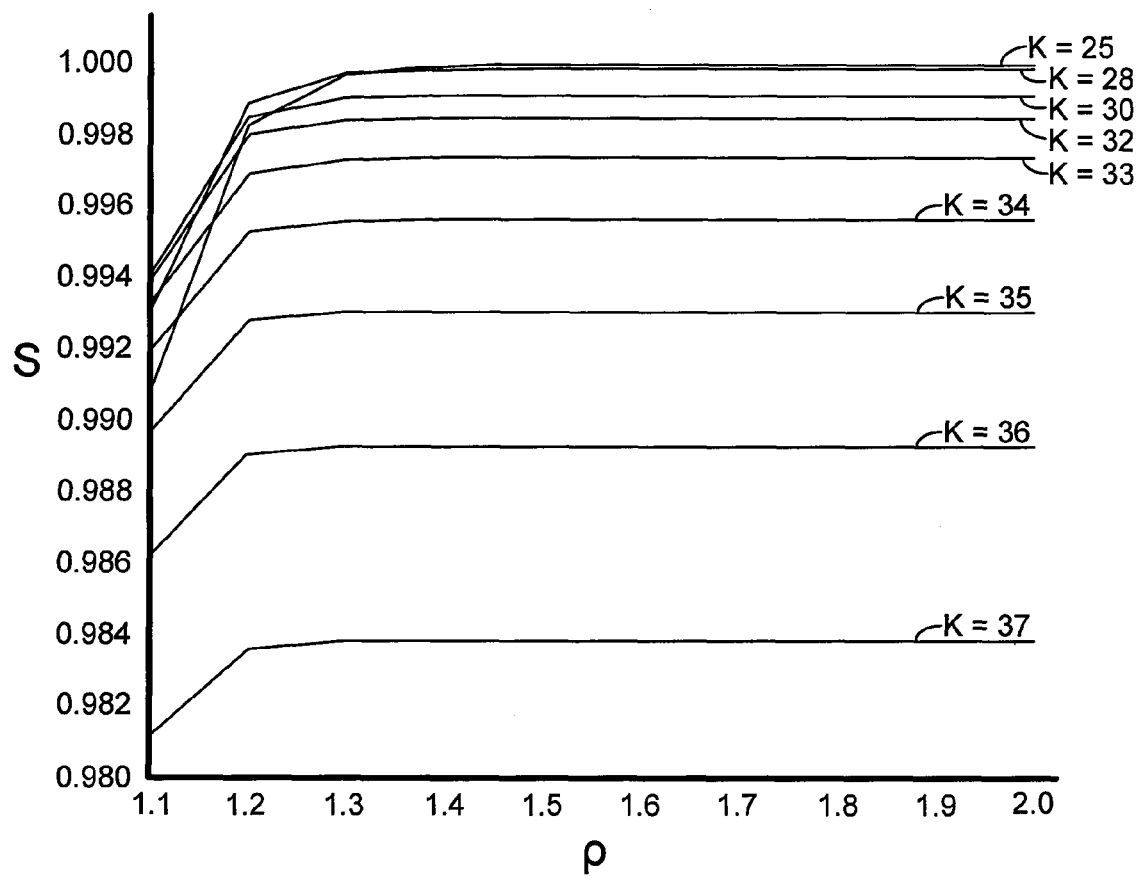
Figure 9:
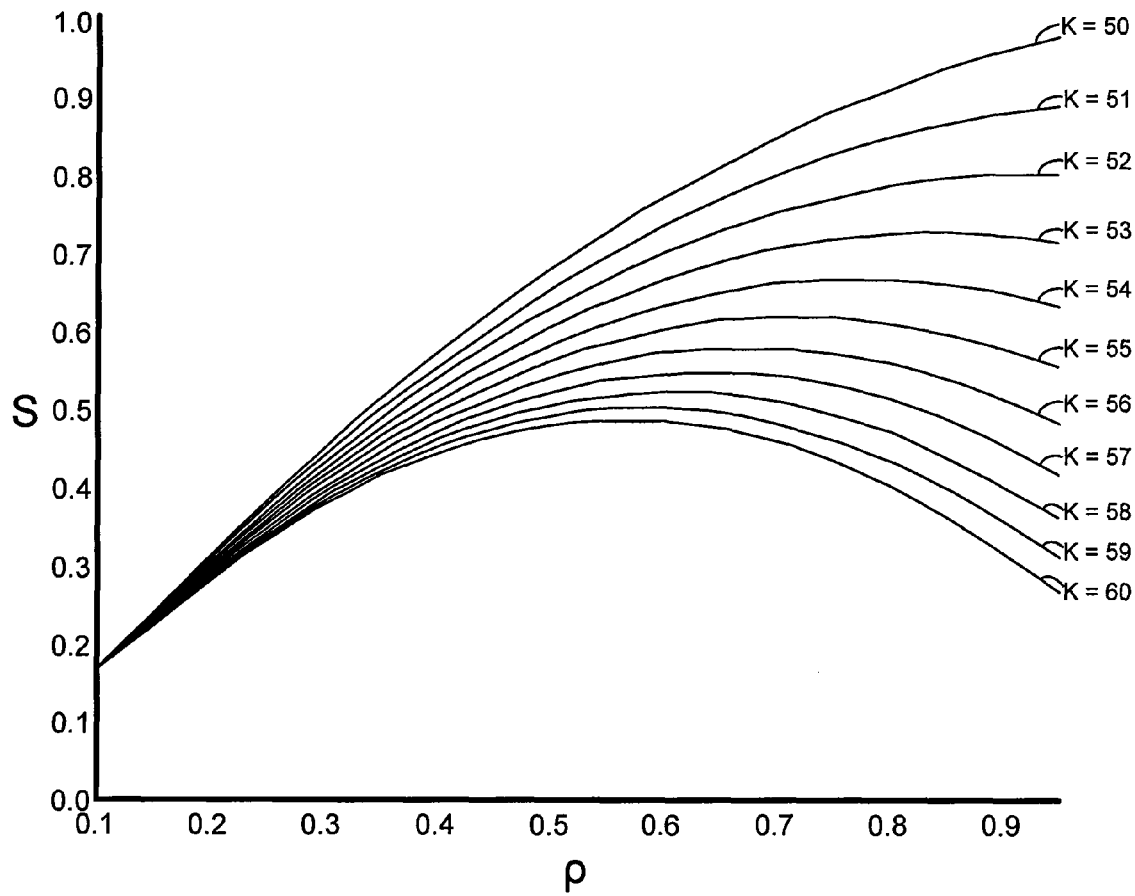

FIGS. 7-9 are two-dimensional plots illustrating throughput S versus processor utilization ρ for different values of buffer size K. As FIG. 7 illustrates, the throughput S first increases with utilization ρ and later it decreases as the utilization ρ increases, with the decrease being more pronounced as K increases. The throughput S tends to be identical for values of K less than 40. An optimal value for the buffer size K can be found in the range between 25 and 35 where the deadline issue does not appear to affect the throughput S.

FIG. 8 is a two-dimensional plot for high values of utilization and for values of buffer size K ranging from 25 to 37, which is the range of K over which the throughput S is fairly identical at low values of processor utilization. As FIG. 8 illustrates, while the range of K from 25 to 30 performs very well at high throughput, K=25 appears to be the optimal value for the chosen set of operating parameters.

FIG. 9 illustrates the monotonic decrease in throughput with increasing utilization as K increases. In this range (K=50, ..., 60), the deadline constraint is more of an issue than the blocking probability constraint. From these results, the optimal operating point can be $b_{opt}$=25 and $\rho_{opt}$=0.9.

It is desirable to ensure that server 130 operates in such a condition that the probability of missing a deadline for a service request is within an acceptable value. For example, server 130 can be operated such that the following condition is satisfied:

$$F_w(d) \geq \alpha, \text{ for } 0 < \alpha < 1. \tag{13}$$

Table I illustrates the values of K and ρ that satisfy the above condition when α=0.9. As Table I illustrates, the values of K that meet the condition for ρ≦0.9 are K≦44. Thus, in order to operate server 130 in such a condition with high throughput while maintaining the probability of missing the deadline at an acceptable value and reducing the blocking probability, an optimal operating point can be $b_{opt}$=40 and $\rho_{opt}$=0.8. Other optimal values for the buffer size value and the processor utilization can also be obtained for other values of mean processing time, waiting time deadline, and/or acceptable value for the probability of missing a deadline.

TABLE I

Values of K and ρ that Satisfy $F_W(d) \geq 0.9$

| | ρ = 0.1 | ρ = 0.3 | ρ = 0.5 | ρ = 0.7 | ρ = 0.9 |
|---|---|---|---|---|---|
| K = 16 | yes | yes | yes | yes | yes |
| K = 18 | yes | yes | yes | yes | yes |
| K = 20 | yes | yes | yes | yes | yes |
| K = 22 | yes | yes | yes | yes | yes |
| K = 24 | yes | yes | yes | yes | yes |
| K = 26 | yes | yes | yes | yes | yes |
| K = 28 | yes | yes | yes | yes | yes |
| K = 30 | yes | yes | yes | yes | yes |
| K = 32 | yes | yes | yes | yes | yes |
| K = 34 | yes | yes | yes | yes | yes |
| K = 36 | yes | yes | yes | yes | yes |
| K = 38 | yes | yes | yes | yes | yes |
| K = 40 | yes | yes | yes | yes | yes |
| K = 42 | yes | yes | yes | yes | yes |
| K = 44 | yes | yes | yes | yes | no |
| K = 46 | yes | yes | yes | no | no |
| K = 48 | yes | yes | no | no | no |
| K = 50 | yes | no | no | no | no |

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Information carriers suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium 110, which can include any form or medium of digital or analog data communication (e.g., a communication network). Transmission medium 110 can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium 110 can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), Media Gateway Control Protocol (MGCP), Really Simple Syndication (RSS), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computerized method for controlling server resources, the method comprising:
    measuring an occupancy value of a buffer configured to store one or more requests for service from at least a first client;
    measuring a first utilization value of a first processor configured to receive and process the one or more requests from the buffer;
    determining a buffer size value based on a processor throughput calculation;
    storing the occupancy value, the first utilization value, and the buffer size value in a computer memory module;
    determining a first service request limit for the first client based on the occupancy value, the first utilization value, and the buffer size value;
    determining a second service request limit $n_2$ for the first client, wherein the first request limit is for a first period of time and the second service request limit is for a second period of time before the first period of time;
    determining a number M of clients that are associated with the first processor;
    determining a value w representing processing time spent by the first processor processing service requests received from the first client in a time interval;
    storing $n_2$, M and w in the computer memory module; and
    wherein the first service request limit is $n_2+w \times (b_s-b)$ when the first utilization value is less than a predetermined utilization value and where $b_s$ is the buffer size value and b is the occupancy value.

2. The method of claim 1 further comprising transmitting the first service request limit to the first client.

3. The method of claim 1 further comprising determining a third service request limit for a second client based on the occupancy value, the first utilization value, and the buffer size value, the buffer further configured to store one or more requests for service from the second client.

4. The method of claim 3 further comprising transmitting the third service request limit to the second client.

5. The method of claim 1
    wherein determining the first service request limit is further based on the number M of clients that are associated with the first processor.

6. The method of claim 5 wherein determining the number M of clients that are associated with the first processor comprises determining the number of clients that are currently registered to request services from the first processor.

7. The method of claim 1, wherein determining the value w representing processing time is based on a first number of requests processed by the first processor in the time interval and a first value representing a mean time to process one of the first number of requests.

8. The method of claim 7, wherein determining the value w representing processing time is further based on a second number of requests processed by the first processor in the time interval and a second value representing a mean time to process the second number of requests, wherein the first number represents requests received for a first class of service and the second number represents requests received for a second class of service.

9. The method of claim 1 wherein the one or more requests for service comprise: a request for voice service, a request for video service, a request for data service, a request for multimedia service, or any combination thereof.

10. The method of claim 1 further comprising:
    measuring a second utilization value of a second processor configured to receive and process the one or more requests from the buffer; and storing the second utilization value in the computer memory module, wherein determining the first service request limit is further based on the second utilization value.

11. The method of claim 1 wherein the processor throughput calculation comprises associations between a plurality of utilization values and a plurality of buffer size values and wherein determining the buffer size value comprises determining that the first utilization value is associated with the buffer size value based on the processor throughput calculation.

12. The method of claim 11 wherein each of the plurality of buffer size values represent a size of the buffer that substantially maximizes, with respect to other buffer size values, a processor throughput of the first processor being utilized according to the associated one of the plurality of utilization values.

13. The method of claim 11 wherein the processor throughput calculation comprises a table including the associations.

14. The method of claim 1 wherein the processor throughput calculation is based on the first utilization value.

15. The method of claim 1 wherein measuring the first utilization value comprises averaging measured utilization of the first processor during a period of time.

16. The method of claim 1 wherein measuring the first utilization value comprises determining a substantially maximum utilization of the first processor that is measured during a period of time.

17. The method of claim 1 wherein measuring the occupancy value comprises averaging measured occupancy of the buffer during a period of time.

18. The method of claim 1 wherein measuring the occupancy value comprises determining a substantially maximum occupancy of the buffer that is measured during a period of time.

19. The method of claim 1 wherein the computer memory module comprises a plurality of memory sub-modules.

20. The method of claim 1,
wherein the first service request limit is $b_s/M$ when the first utilization value is greater than a predetermined utilization value, the occupancy value is greater than the buffer size value, and w is greater than a predetermined value representing processing time;
wherein the first service request limit is $n_2+w\times(b_s-b)$ when the first utilization value is greater than a predetermined utilization value, the occupancy value is greater than the buffer size value, and w is less than the predetermined value representing processing time; and
wherein the first service request limit is $n_2$ when the first utilization value is greater than a predetermined utilization value, and the occupancy value is less than the buffer size value.

21. A system for controlling server resources, the system comprising:
a buffer configured to store one or more requests for service from at least a first client;
a first processor configured to receive and process the one or more requests from the buffer; and
a controller having:
a computing means for measuring an occupancy value of the buffer;
a computing means for measuring a first utilization value of the first processor;
a computing means for determining a buffer size value based on a processor throughput calculation;
a computing means for determining a first service request limit for the first client based on the occupancy value, the first utilization value, and the buffer size value;
a computing means for determining a second service request limit $n_2$ for the first client, wherein the first request limit is for a first period of time and the second service request limit is for a second period of time before the first period of time;
a computing means for determining a number M of clients that are associated with the first processor;
a computer means for determining a value w representing processing time spent by the first processor processing service requests received from the first client in a time interval;
a computer means for storing $n_2$, M and w in the computer memory module; and
wherein the first service request limit is $n_2+w\times(b_s-b)$ when the first utilization value is less than a predetermined utilization value and where $b_s$ is the buffer size value and b is the occupancy value.

22. The system of claim 21 further comprising a second processor configured to receive and process the one or more requests from the buffer, wherein the controller is further configured to measure a second utilization value of the second processor and to determine the first service request limit based on the second utilization value.

23. The system of claim 21,
wherein the first service request limit is $b_s/M$ when the first utilization value is greater than a predetermined utilization value, the occupancy value is greater than the buffer size value, and w is greater than a predetermined value representing processing time;
wherein the first service request limit is $n_2+w\times(b_s-b)$ when the first utilization value is greater than a predetermined utilization value, the occupancy value is greater than the buffer size value, and w is less than the predetermined value representing processing time; and
wherein the first service request limit is $n_2$ when the first utilization value is greater than a predetermined utilization value, and the occupancy value is less than the buffer size value.

24. A computer program product, tangibly embodied in a non-transitory machine-readable storage device, the computer program product including instructions being operable to cause a data processing apparatus to:
measure an occupancy value of a buffer configured to store one or more requests for service from at least a first client;
measure a first utilization value of a first processor configured to receive and process the one or more requests from the buffer;
determine a buffer size value based on a processor throughput calculation;
store the occupancy value, the first utilization value, and the buffer size value in a computer memory module;
determine a first service request limit for the first client based on the occupancy value, the first utilization value, and the buffer size value;
determine a second service request limit $n_2$ for the first client, wherein the first request limit is for a first period of time and the second service request limit is for a second period of time before the first period of time;
determine a number M of clients that are associated with the first processor;
determine a value w representing processing time spent by the first processor processing service requests received from the first client in a time interval;
store $n_2$, M and w in the computer memory module; and
wherein the first service request limit is $n_2+w\times(b_s-b)$ when the first utilization value is less than a predetermined utilization value and where $b_s$ is the buffer size value and b is the occupancy value.

25. The system of claim 24,
wherein the first service request limit is $b_s/M$ when the first utilization value is greater than a predetermined utilization value, the occupancy value is greater than the buffer size value, and w is greater than a predetermined value representing processing time;

wherein the first service request limit is $n_2+w\times(b_s-b)$ when the first utilization value is greater than a predetermined utilization value, the occupancy value is greater than the buffer size value, and w is less than the predetermined value representing processing time; and wherein the first service request limit is $n_2$ when the first utilization value is greater than a predetermined utilization value, and the occupancy value is less than the buffer size value.

* * * * *